(12) United States Patent
Geyer (10) Patent No.: US 10,738,720 B2
(45) Date of Patent: Aug. 11, 2020

(54) METHOD FOR CONTROLLING AN AIR BOOSTING APPARATUS IN A TWO-STROKE, OPPOSED PISTON ENGINE, AND A TWO-STROKE, OPPOSED PISTON ENGINE WITH AN AIR BOOSTING APPARATUS

(71) Applicants: VOLVO TRUCK CORPORATION, Gothenburg (SE); Stephen Geyer, Greencastle, PA (US)

(72) Inventor: Stephen Geyer, Greencastle, PA (US)

(73) Assignee: Volvo Truck Corporation, Gothenburg (SE)

( * ) Notice: Subject to any disclaimer, the term of this patent is extended or adjusted under 35 U.S.C. 154(b) by 599 days.

(21) Appl. No.: 15/513,055

(22) PCT Filed: Sep. 29, 2014

(86) PCT No.: PCT/US2014/058109
§ 371 (c)(1),
(2) Date: Mar. 21, 2017

(87) PCT Pub. No.: WO2016/053257
PCT Pub. Date: Apr. 7, 2016

(65) Prior Publication Data
US 2017/0248088 A1    Aug. 31, 2017

(51) Int. Cl.
| F02D 41/00 | (2006.01) |
| F01B 7/02 | (2006.01) |
| F02B 75/28 | (2006.01) |
| F02B 37/04 | (2006.01) |
| F02M 26/08 | (2016.01) |

(Continued)

(52) U.S. Cl.
CPC ............ *F02D 41/0007* (2013.01); *F01B 7/02* (2013.01); *F02B 37/04* (2013.01); *F02B 75/02* (2013.01); *F02B 75/28* (2013.01); *F02D 41/1454* (2013.01); *F02M 26/08* (2016.02); *F02B 2075/025* (2013.01); *F02D 2200/024* (2013.01);

(Continued)

(58) Field of Classification Search
CPC .... F02D 41/0007; F02D 41/1454; F01B 7/02; F02B 2075/025; F02B 75/02
USPC ...................................... 123/46 R
See application file for complete search history.

(56) References Cited

U.S. PATENT DOCUMENTS

| 4,233,815 A | 11/1980 | Melchior |
| 6,467,269 B1 | 10/2002 | Dutart |

(Continued)

FOREIGN PATENT DOCUMENTS

WO    2013126347 A1    8/2013

OTHER PUBLICATIONS

International Search Report (dated Dec. 30, 2014) for corresponding International App. PCT/US2014/058109.

(Continued)

*Primary Examiner* — Ngoc T Nguyen
(74) *Attorney, Agent, or Firm* — WRB-IP LLP (57) ABSTRACT

A method includes operating an air boosting apparatus of a two-stroke, opposed piston engine as a function of one or more factors including a first engine speed, a first torque, demand, a first altitude, a first transient rate, and one or more first ambient conditions to provide a first pressure S ratio (PR} of pre-turbine pressure (PTP) versus turbocharger compressor discharge pressure (CDP} and a first air-to-fuel ratio (AFR).

22 Claims, 5 Drawing Sheets (51) Int. Cl.
    *F02B 75/02*    (2006.01)
    *F02D 41/14*    (2006.01)

(52) U.S. Cl.
    CPC .... *F02D 2200/101* (2013.01); *F02D 2200/70* (2013.01); *Y02T 10/144* (2013.01)

(56) References Cited

U.S. PATENT DOCUMENTS

| | | | |
|---|---|---|---|
| 8,276,552 B2 | 10/2012 | Lemke et al. | |
| 8,474,435 B2 | 7/2013 | Lemke | |
| 8,549,854 B2 | 10/2013 | Dion et al. | |
| 8,746,190 B2 | 6/2014 | Lemke et al. | |
| 2005/0050887 A1* | 3/2005 | Frank | B60K 6/44 60/597 |
| 2010/0300383 A1 | 12/2010 | Pursifull et al. | |
| 2011/0225967 A1* | 9/2011 | Karnik | F02B 37/16 60/602 |
| 2012/0240909 A1 | 9/2012 | Geyer | |
| 2013/0174548 A1 | 7/2013 | Dion | |
| 2013/0211693 A1 | 8/2013 | Petrovic et al. | |
| 2014/0373816 A1* | 12/2014 | Nagar | F02D 41/0007 123/51 B |
| 2015/0047605 A1* | 2/2015 | Buckland | F02B 37/164 123/403 |

OTHER PUBLICATIONS

International Preliminary Report on Patentability (dated Oct. 31, 2016), for corresponding International App. PCT/US2014/058109.
European Official Action ((dated Aug. 10, 2018) for corresponding European App. 14903271.6.

* cited by examiner

FIG. 1

```
┌─────────────────────────────────────────────────────────────┐
│ OPERATE AIR BOOSTING APPARATUS AS A FUNCTION OF A FIRST ENGINE │
│ SPEED, A FIRST TORQUE DEMAND, AND ONE OR MORE FIRST AMBIENT │
│ CONDITIONS TO PROVIDE A FIRST PRESSURE RATIO (PR) OF PRE-TURBINE │
│ PRESSURE (PTP) VERSUS TURBOCHARGER COMPRESSOR DISCHARGE │
│ PRESSURE (CDP) AND A FIRST AIR-TO-FUEL RATIO (AFR) │
└─────────────────────────────────────────────────────────────┘
                    S1

┌─────────────────────────────────────────────────────────────┐
│ OPERATING THE AIR BOOSTING APPARATUS AS A FUNCTION OF A FIRST │
│ ALTITUDE TO PROVIDE THE FIRST PR AND THE FIRST AFR │
└─────────────────────────────────────────────────────────────┘
                    S1b

┌─────────────────────────────────────────────────────────────┐
│ REGISTERING A CHANGE IN AT LEAST ONE FIRST AMBIENT CONDITION OF THE │
│ ONE OR MORE FIRST AMBIENT CONDITIONS TO A SECOND AMBIENT CONDITION │
└─────────────────────────────────────────────────────────────┘
                    S2

┌─────────────────────────────────────────────────────────────┐
│ REGISTERING A CHANGE IN THE FIRST TORQUE DEMAND TO A SECOND TORQUE │
│ DEMAND │
└─────────────────────────────────────────────────────────────┘
                    S2a

┌─────────────────────────────────────────────────────────────┐
│ REGISTERING A CHANGE IN ALTITUDE TO A SECOND ALTITUDE │
└─────────────────────────────────────────────────────────────┘
                    S2b

┌─────────────────────────────────────────────────────────────┐
│ ADJUSTING OPERATION OF THE AIR BOOSTING APPARATUS IN RESPONSE TO │
│ THE REGISTERED CHANGE FROM THE FIRST TO THE SECOND AMBIENT │
│ CONDITION TO PROVIDE A SECOND PR AND A SECOND AFR │
└─────────────────────────────────────────────────────────────┘
                    S3

┌─────────────────────────────────────────────────────────────┐
│ ADJUSTING OPERATION OF THE AIR BOOSTING APPARATUS IN RESPONSE TO │
│ THE REGISTERED CHANGE FROM THE FIRST TO THE SECOND TORQUE DEMAND │
│ TO PROVIDE THE SECOND PR AND THE SECOND AFR │
└─────────────────────────────────────────────────────────────┘
                    S3a

┌─────────────────────────────────────────────────────────────┐
│ ADJUSTING OPERATION OF THE AIR BOOSTING APPARATUS IN RESPONSE TO │
│ THE REGISTERED CHANGE FROM THE FIRST TO THE SECOND ALTITUDE TO │
│ PROVIDE THE SECOND PR AND THE SECOND AFR │
└─────────────────────────────────────────────────────────────┘
                    S3b
```

FIG. 2

```
┌─────────────────────────────────────────────────────────────────┐
│ OPERATING THE AIR BOOSTING APPARATUS AS A FUNCTION OF A FIRST ENGINE │
│ SPEED, A FIRST TORQUE DEMAND, AND A FIRST ALTITUDE TO PROVIDE A FIRST │
│ PRESSURE RATIO (PR) OF PRE-TURBINE PRESSURE (PTP) VERSUS         │
│ TURBOCHARGER COMPRESSOR DISCHARGE PRESSURE (CDP) AND A FIRST AIR- │
│ TO-FUEL RATIO (AFR)                                             │
└─────────────────────────────────────────────────────────────────┘
                            S1'  │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ OPERATING THE AIR BOOSTING APPARATUS AS A FUNCTION OF ONE OR MORE │
│ FIRST AMBIENT CONDITIONS TO PROVIDE THE FIRST PR AND THE FIRST AFR │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                           S1b'  │
                                 ▼
┌─────────────────────────────────────────────────────────────────┐
│        REGISTERING A CHANGE IN ALTITUDE TO A SECOND ALTITUDE     │
└─────────────────────────────────────────────────────────────────┘
                           S2'   │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ REGISTERING A CHANGE IN THE FIRST TORQUE DEMAND TO A SECOND TORQUE │
│                           DEMAND                                │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                          S2a'   │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ REGISTERING A CHANGE IN AT LEAST ONE AMBIENT CONDITION OF THE ONE OR │
│    MORE FIRST AMBIENT CONDITIONS TO A SECOND AMBIENT CONDITION   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                          S2b'   │
                                 ▼
┌─────────────────────────────────────────────────────────────────┐
│ ADJUSTING OPERATION OF THE AIR BOOSTING APPARATUS IN RESPONSE TO │
│ THE REGISTERED CHANGE FROM THE FIRST TO THE SECOND ALTITUDE TO  │
│         PROVIDE A SECOND PR AND A SECOND AFR                    │
└─────────────────────────────────────────────────────────────────┘
                           S3'   │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ ADJUSTING OPERATION OF THE AIR BOOSTING APPARATUS IN RESPONSE TO │
│ THE REGISTERED CHANGE FROM THE FIRST TO THE SECOND TORQUE DEMAND │
│         TO PROVIDE THE SECOND PR AND THE SECOND AFR             │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                          S3a'   │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ ADJUSTING OPERATION OF THE AIR BOOSTING APPARATUS IN RESPONSE TO │
│   THE REGISTERED CHANGE FROM THE FIRST TO THE SECOND AMBIENT    │
│      CONDITION TO PROVIDE THE SECOND PR AND THE SECOND AFR      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                          S3b'
```

```
┌─────────────────────────────────────────────────────────────────────────┐
│ OPERATING THE AIR BOOSTING APPARATUS AS A FUNCTION OF A FIRST ENGINE    │
│ SPEED, A FIRST TORQUE DEMAND, AND FIRST TRANSIENT RATE TO PROVIDE A     │
│ FIRST PRESSURE RATIO (PR) OF PRE-TURBINE PRESSURE (PTP) VERSUS          │
│ TURBOCHARGER COMPRESSOR DISCHARGE PRESSURE (CDP) AND A FIRST AIR-       │
│ TO-FUEL RATIO (AFR)                                                     │
└─────────────────────────────────────────────────────────────────────────┘
                                  S1'''' ↓
┌─────────────────────────────────────────────────────────────────────────┐
│ OPERATING THE AIR BOOSTING APPARATUS AS A FUNCTION OF ONE OR MORE       │
│ FIRST AMBIENT CONDITIONS TO PROVIDE THE FIRST PR AND THE FIRST AFR      │
└─────────────────────────────────────────────────────────────────────────┘
                                  S1a''' ↓
┌─────────────────────────────────────────────────────────────────────────┐
│ REGISTERING A CHANGE FROM THE FIRST TRANSIENT RATE TO A SECOND          │
│ TRANSIENT RATE                                                          │
└─────────────────────────────────────────────────────────────────────────┘
                                  S2''' ↓
┌─────────────────────────────────────────────────────────────────────────┐
│ REGISTERING A CHANGE IN THE FIRST TORQUE DEMAND TO A SECOND TORQUE      │
│ DEMAND                                                                  │
└─────────────────────────────────────────────────────────────────────────┘
                                  S2a''' ↓
┌─────────────────────────────────────────────────────────────────────────┐
│ REGISTERING A CHANGE IN THE FIRST TORQUE DEMAND TO A SECOND TORQUE      │
│ DEMAND                                                                  │
└─────────────────────────────────────────────────────────────────────────┘
                                  S2b''' ↓
┌─────────────────────────────────────────────────────────────────────────┐
│ ADJUSTING OPERATION OF THE AIR BOOSTING APPARATUS IN RESPONSE TO        │
│ THE REGISTERED CHANGE FROM THE FIRST TO THE SECOND TRANSIENT RATE       │
│ TO PROVIDE A SECOND PR AND A SECOND AFR                                 │
└─────────────────────────────────────────────────────────────────────────┘
                                  S3''' ↓
┌─────────────────────────────────────────────────────────────────────────┐
│ ADJUSTING OPERATION OF THE AIR BOOSTING APPARATUS IN RESPONSE TO        │
│ THE REGISTERED CHANGE FROM THE FIRST TO THE SECOND AMBIENT              │
│ CONDITION TO PROVIDE THE SECOND PR AND THE SECOND AFR                   │
└─────────────────────────────────────────────────────────────────────────┘
                                  S3a''' ↓
┌─────────────────────────────────────────────────────────────────────────┐
│ ADJUSTING OPERATION OF THE AIR BOOSTING APPARATUS IN RESPONSE TO        │
│ THE REGISTERED CHANGE FROM THE FIRST TO THE SECOND TORQUE DEMAND        │
│ TO PROVIDE THE SECOND PR AND THE SECOND AFR                             │
└─────────────────────────────────────────────────────────────────────────┘
                                  S3b'''
```

FIG. 5

METHOD FOR CONTROLLING AN AIR BOOSTING APPARATUS IN A TWO-STROKE, OPPOSED PISTON ENGINE, AND A TWO-STROKE, OPPOSED PISTON ENGINE WITH AN AIR BOOSTING APPARATUS

BACKGROUND AND SUMMARY

The development of a two stroke engine is a significant challenge even though they have been around for years. The thermal efficiency of a two stroke engine has historically been better than its four stroke competitor. The historic two stroke engines have been operated in more steady power output applications and more for a power to weight advantage. The transient control of a two stroke engine while getting the absolute best fuel economy will be a challenge for modern two stroke engines applied to on highway vehicles.

The inventor has recognized that control of the blower device (i.e., supercharger or other air boosting apparatus) is critical because power is required to operate these devices, and that the general goal should be to consume as little power for these devices as possible to get the best fuel economy possible. This leas to be done over varying altitude and ambient conditions. In the past, blower devices have typically operated based on a fixed ratio to the engine speed. Blower device size would typically be selected for a worst-case scenario and fuel would have to be adjusted as conditions changed. At high altitudes, for example, engine power level would be significantly reduced and/or temperature rises in the cylinder line, the piston, and the exhaust system would occur.

In accordance with another aspect of the invention, a method for controlling an air boosting apparatus in a two-stroke, opposed piston engine, is provided, the air boosting apparatus being arranged to boost air pressure in a charge air stream upstream of a cylinder of the engine. The method comprises operating the air boosting apparatus as a function of a first engine speed, a first torque demand, and one or more first ambient conditions to provide a first pressure ratio (PR) of pre-turbine pressure (PTP) versus turbocharger compressor discharge pressure (CDP) and a first air-to-fuel ratio (AFR), registering a change in at least one first ambient condition of the one or more first ambient conditions to a second ambient condition, and adjusting operation of the air boosting apparatus in response to the registered change from the first to the second ambient condition to provide a second PR and a second AFR.

In accordance with another aspect of the invention, a method for controlling an air boosting apparatus in a two-stroke, opposed piston engine, is provided, the air boosting apparatus being arranged to boost air pressure in a charge air stream upstream of a cylinder of the engine. The method comprises operating the air boosting apparatus as a function of a first engine speed, a first torque demand, and a first altitude to provide a first pressure ratio (PR) of pre-turbine pressure (PTP) versus turbocharger compressor discharge pressure (CDP) and a first air-to-fuel ratio (AFR), registering a change in altitude to a second altitude, and adjusting operation of the air boosting apparatus in response to the registered change from the first to the second altitude to provide a second PR and a second AFR.

In accordance with another aspect of the invention, a method for controlling an air boosting apparatus in a two-stroke, opposed piston engine, is provided, the air boosting apparatus being arranged to boost air pressure in a charge air stream upstream of a cylinder of the engine. The method comprises operating the air boosting apparatus as a function of a first engine speed and a first torque demand to provide a first pressure ratio (PR) of pre-turbine pressure (PTP) versus turbocharger compressor discharge pressure (CDP) and a first air-to-fuel ratio (AFR), registering a change in the first torque demand to a second torque demand, and adjusting operation of the air boosting apparatus in response to the registered change from the first to the second torque demand to provide a second PR and a second AFR.

In accordance with another aspect of the invention, a method for controlling an air boosting apparatus in a two-stroke, opposed piston engine, is provided, the air boosting apparatus being arranged to boost air pressure in a charge air stream upstream of a cylinder of the engine. The method comprises operating the air boosting apparatus as a function of a first engine speed, a first torque demand, and first transient rate to provide a first pressure ratio (PR) of pre-turbine pressure (PTP) versus turbocharger compressor discharge pressure (CDP) and a first air-to-fuel ratio (AFR), registering a change from the first transient rate to a second transient rate, adjusting operation of the air boosting apparatus in response to the registered change from the first to the second transient rate to provide a second PR and a second AFR.

In accordance with another aspect of the invention, a method for controlling an air boosting apparatus in a two-stroke, opposed piston engine, is provided, the air boosting apparatus being arranged to boost air pressure in a charge air stream upstream of a cylinder of the engine. The method comprises operating the air boosting apparatus as a function of at least one of
   a first engine speed,
   a first torque demand,
   a first altitude,
   a first transient rate, and
   one or more first ambient conditions
to provide a first pressure ratio (PR) of pre-turbine pressure (PTP) versus turbocharger compressor discharge pressure (CDR) and a first air-to-fuel ratio (AFR), registering a change in the at least one of
   the first engine speed to a second engine speed,
   the first torque demand to a second torque demand,
   the first altitude to a second altitude,
   the first transient rate to a second transient rate, and
   the one or more first ambient conditions to one or more second ambient conditions, and adjusting operation of the an boosting apparatus in response to the registered change to provide a second PR and a second AFR.

In accordance with another aspect of the present invention, a two-stroke, opposed piston engine comprises an air boosting apparatus arranged to boost air pressure in a charge air stream upstream of a cylinder of the engine; and a controller arranged to operate the air boosting apparatus as a function of at least one of
   a first engine speed,
   a first torque demand,
   a first altitude,
   a first transient rate, and
   one or more first ambient conditions
to provide a first pressure ratio (PR) of pre-turbine pressure (PTP) versus turbocharger compressor discharge pressure (CDP) and a first air-to-fuel ratio (AFR), register a change in the at least one of
   the first engine speed to a second engine speed,
   the first torque demand to a second torque demand,
   the first altitude to a second altitude, the first transient rate to a second transient rate, and the one or more first ambient conditions to one or more second ambient conditions, and adjust operation of the air boosting apparatus in response to the registered change to provide a second PR and a second AFR.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
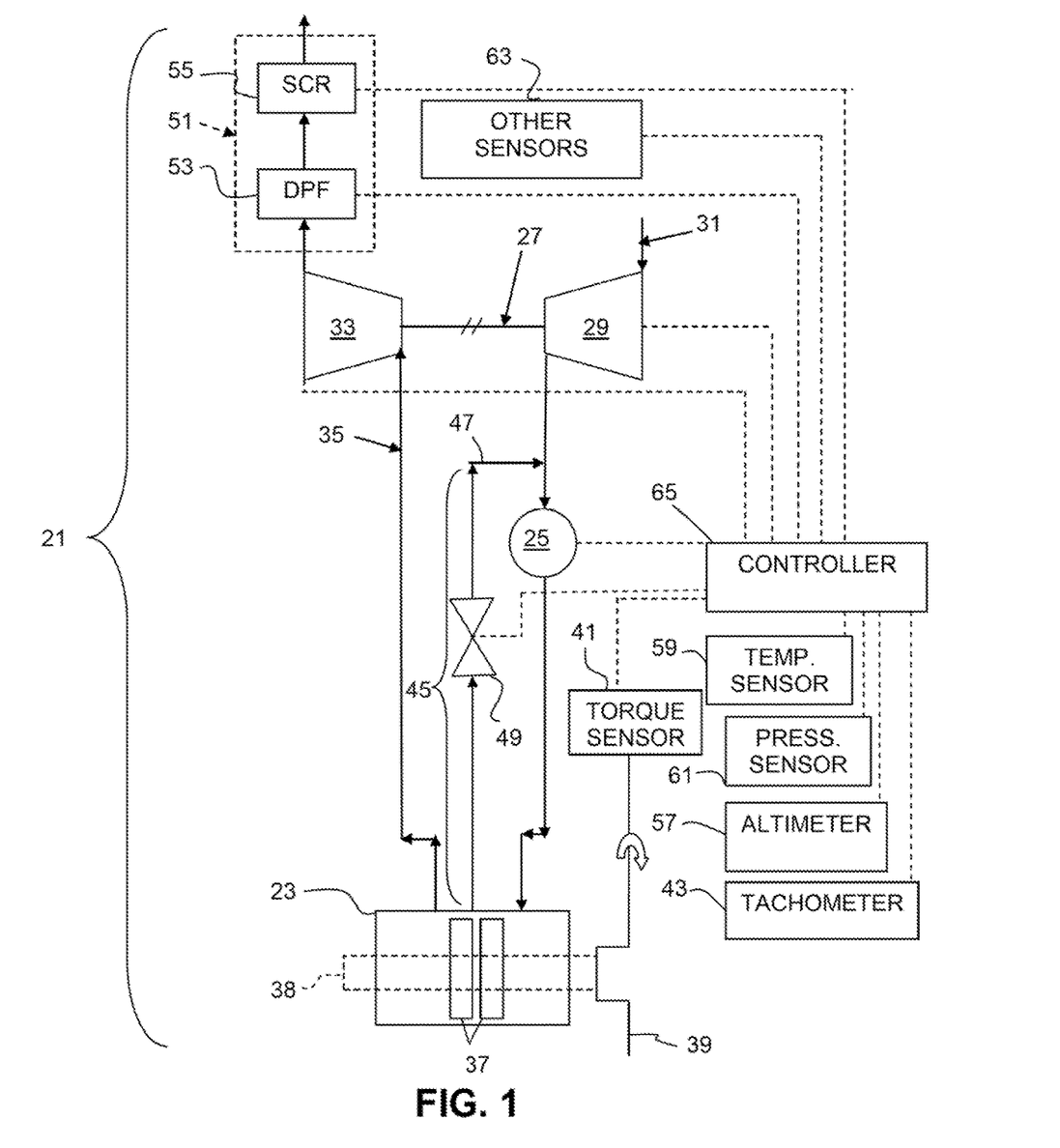
FIG. 1 is a schematic view of an engine according to an aspect of the present invention.

A two-stroke, opposed piston engine 21 is shown in FIG. 1. The engine 21 can be used in connection with a vehicle (not shown), however, it will be appreciated that the engine can be used in connection with a variety of apparatus other than vehicles. The engine 21 includes a cylinder 23 (i.e., at least one cylinder) and an air boosting apparatus 25 upstream of the cylinder. The air boosting apparatus 25 is device such as a blower, supercharger, or other device suitable for boosting air pressure upstream of the cylinder 23. The air boosting apparatus 25 is a variable speed device that permits delivery of an optimal pressure ratio (PR) of pre-turbine pressure (PTP) versus turbocharger compressor discharge pressure (CDP) and/or an optimal air-to-fuel ratio (AFR) that can be operated in a manner that will facilitate obtaining the best possible fuel economy from the engine. The air boosting apparatus 25 can respond rapidly to changing conditions such as altitude and transient rage, and can return to normal operation to obtain optimal fuel economy.

The engine 21 may include a turbocharger 27 including a compressor 29, usually in an intake line 31 upstream of the air boosting apparatus 25, and a turbine 33 usually in an exhaust line 35 downstream of the cylinder 23 or an exhaust manifold (not shown) associated with a plurality of cylinders.

Pistons 37 in the cylinder 23 are linked by a suitable linkage arrangement 38 (shown in phantom) (often including piston rods and gears) to a crankshaft 39 that can exert a torque to drive machinery such as a vehicle transmission (not shown). The torque exerted through the crankshaft 39 can be measured by a torque sensor 41. The speed at which the crankshaft 39 rotates, i.e., the engine 21 speed, can be measured by a tachometer 43.

The engine 21 may include an Exhaust Gas Recirculation (EGR) system 45 involving a conduit 47 that usually extends from a point in the cylinder 23 at some point between the position of the pistons 37 where the exhaust and intake ports no shown) in the cylinder are opened by the pistons to a point in the intake line 31 that is usually downstream of any compressor 29 and upstream of the cylinder and the air boosting apparatus 25. U.S. Pat. No. 8,549,854 discloses an EGR system for an opposed piston engine and is incorporated by reference. An EGR valve 49 is ordinarily provided in the conduit 47, as well as an EGR cooler (not shown)

The engine 21 may further include an Exhaust Aftertreatment System (EATS) 51 downstream of the cylinder 23 that may include a variety of devices for treating the exhaust gases, such as a diesel oxidation catalyst (not shown) diesel particulate filter (DPF) 53 and a Selective Catalyst Reduction catalyst (SCR) 55.

A variety of sensors can be provided to sense characteristics of the location of operation, such as an altimeter 57, and ambient conditions such as (but not limited to) temperature and atmospheric pressure via a temperature sensor 59 and a pressure sensor 61 and air pressure (a function of temperature and pressure). Other sensors 63 that might be provided include sensors for sensing exhaust pressure upstream and downstream of EATS 51 components such as the DPF 53 such as might be useful to determine the need for regeneration of the DPF, temperature sensors for sensing exhaust temperatures in or upstream of the EATS components such as might be useful to determining whether the exhaust temperatures are within acceptable operating ranges for the components, and temperature and pressure sensors in the intake line. A controller 65 can respond to driver input from an accelerator pedal and/or to a rate of change from the accelerator pedal.

Signals from sensors such as the torque sensor 41, the tachometer 43, the altimeter 57, the temperature sensor 59, the pressure sensor 61, and other sensors 63 can be sent to a controller 65, such as an ECU or other suitable computing device. The controller 65 can, in turn, control operation of structures such as the air boosting apparatus 25, fuel injectors (not shown), the EGR valve 49, and other equipment forming part of or associated with the engine 21 such as compressor 29 and turbine 31 operation, such as by control of variable geometry turbine, the DPF 53 (such as by control of performance of regeneration or filter bypass), and the SCR (such as control of reductant injection or device bypass).

In an aspect of the present invention, a method for controlling the air boosting apparatus 25 is provided. The air boosting apparatus 25 is arranged to boost air pressure in the charge air stream in the air intake line 31 upstream of the cylinder 23 of the engine 21.

Figure 2:
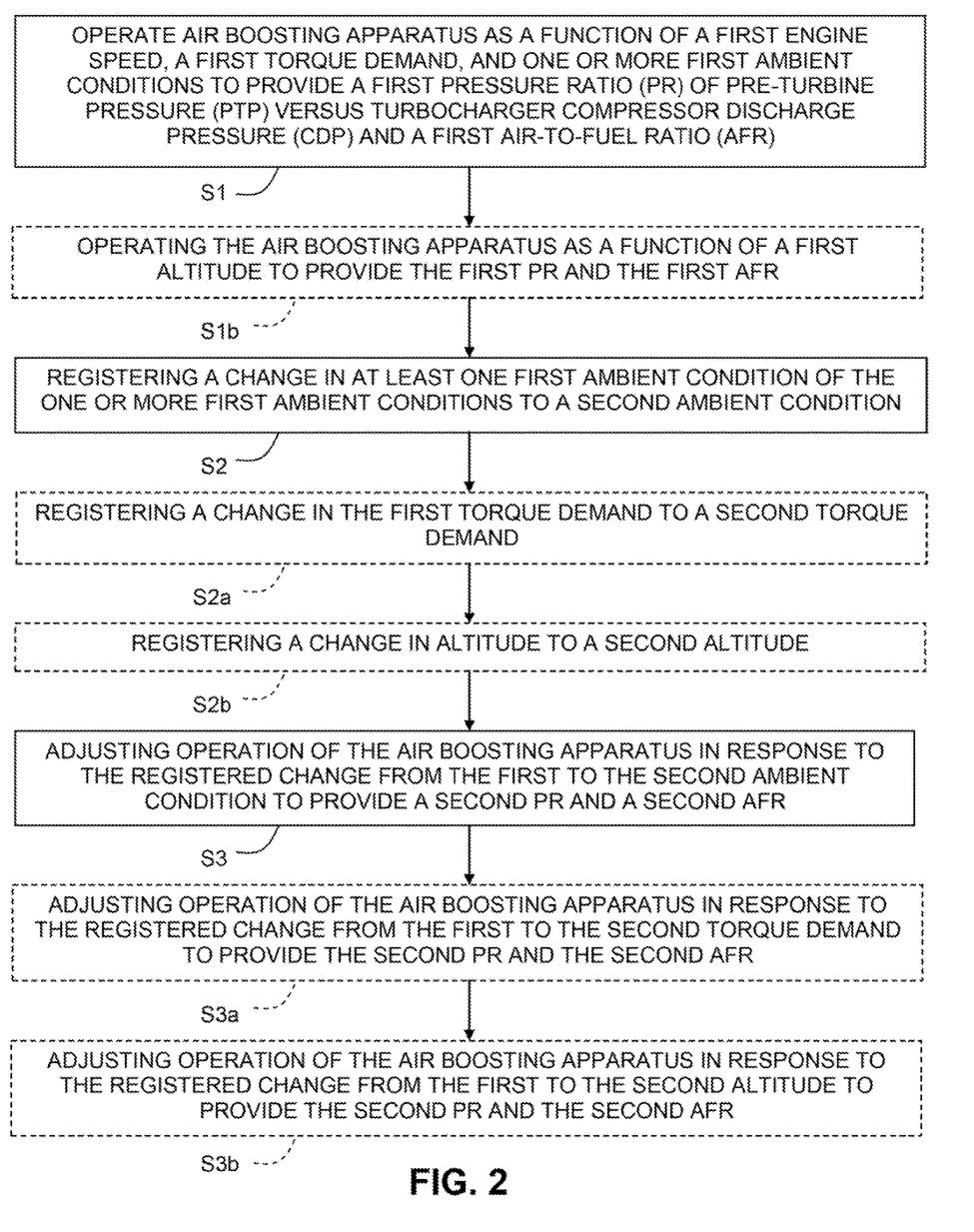
FIG. 2 is a flow diagram of a method according to an aspect of the present invention.

As seen in an aspect of the method described in connection with FIG. 2, according to the method, in a first step S1 of the method, the air boosting apparatus 25 is operated as a function of a first engine speed that can be measured by the tachometer 43 (or other suitable means such as a magnetic pickup speed sensor), a first torque demand that can be measured by the torque sensor 41 (i.e. based on the torque sensed) or by some other suitable means, such as a degree to which an accelerator (not shown) is depressed (torque can also be derived from, e.g., a model or mapping from the inputs actuators, and sensors which include engine speed, pedal position (not shown), injection timing (not shown), injection pressure (not shown), EGR flow, ambient pressure, turbocharger position, and boosting apparatus adjustment), and one or more first ambient conditions that can be measured by the temperature sensor 59, the pressure sensor 61, or other sensors 6 to provide a first pressure ratio (PR) of pre-turbine pressure (PTP) versus turbocharger compressor discharge pressure (CDP) and a first air-to-fuel ratio (AFR). In a second step S2, a change in at least one first ambient condition of the one or more first ambient conditions to a second ambient condition is registered. In a third step S3, operation of the air boosting apparatus 25 is adjusted in response to the registered change from the first to the second, ambient condition to provide a second PR and a second AFR.

Operation of the an boosting apparatus 25 can be adjusted in response to the registered change from the first to the second ambient condition so that at least one of the second PR and the second AFR are the same as the first PR and the first AFR, i.e., where the registered change would result in a change in the first PR and/or the first AFR, all other things being equal, the air boosting apparatus can be operated cause the first PR and/or the first AFR to remain the same. Operation of the air boosting apparatus 25 can alternatively be adjusted in response to the registered change from the first to the second ambient condition so that at least one of the second PR and the second AFR are different from the first PR and the first AFR.

In addition to adjusting operation of the air boosting apparatus 25 in response to the registered change from the first to the second ambient condition, operation of the air boosting apparatus can be adjusted as seen in step S3a, in response to a change in the first torque demand to a second torque demand registered in step S2a, to provide the second PR and the second AFR. Further, the air boosting apparatus 25 can be operated, as seen in step S1b, as a function of a first altitude that can be measured by the altimeter 57 to provide the first PR and the first AFR, and the method can comprise a step S2b of registering a change in altitude to a second altitude, and a step S3b of adjusting operation of the air boosting apparatus in response to the registered change from the first to the second altitude to provide the second PR and the second AFR.

Figure 3:
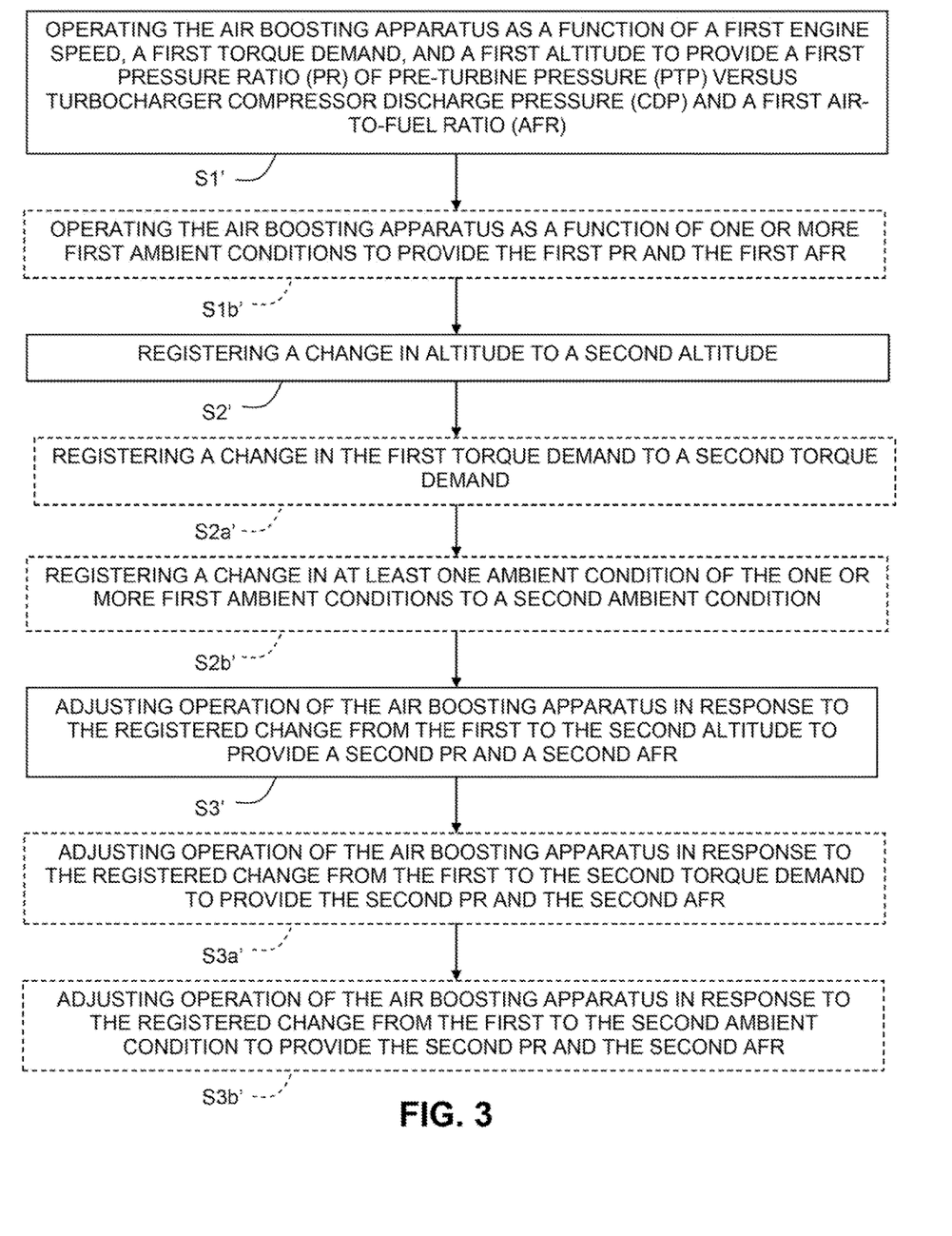
FIG. 3 is a flow diagram of a method according to another aspect of the present invention.

As seen in another aspect of the present invention described in connection with FIG. 3, the air boosting apparatus 25 can be operated at step S1' as a function of a first engine speed, a first torque demand, and a first altitude to provide a first pressure ratio (PR) of pre-turbine pressure (PTP) versus turbocharger compressor discharge pressure (CDP) and a first air-to-fuel ratio (AFR). At step S2', a change in altitude to a second altitude is registered. At step S3', operation of the air boosting apparatus 25 is adjusted in response to the registered change from the first to the second altitude to provide a second PR and a second AFR.

The operation of the air boosting apparatus 25 can be adjusted in response to the registered change from the first to the second altitude so that at least one of the second PR and the second AFR are the same as the first PR and the first AFR, or so that at least one of the second PR and the second AFR are different from the first PR and the first AFR.

In addition to adjusting operation of the air boosting apparatus 25 in response to the registered change from the first to the second altitude, a change in the first torque demand to a second torque demand can be registered at step S2a' and operation of the air boosting apparatus can be adjusted at step S3a' in response to the registered change from the first to the second torque demand to provide the second PR and the second AFR. The air boosting apparatus 25 may further be operated at step S1b' as a function of one or more first ambient conditions to provide the first PR and the first AFR, a change in at least one ambient condition of the one or more first ambient conditions to a second ambient condition can be registered at step S2b', and operation of the air boosting apparatus can be adjusted at step S3b' in response to the registered change from the first to the second ambient condition to provide the second P and the second AFR.

Figure 4:
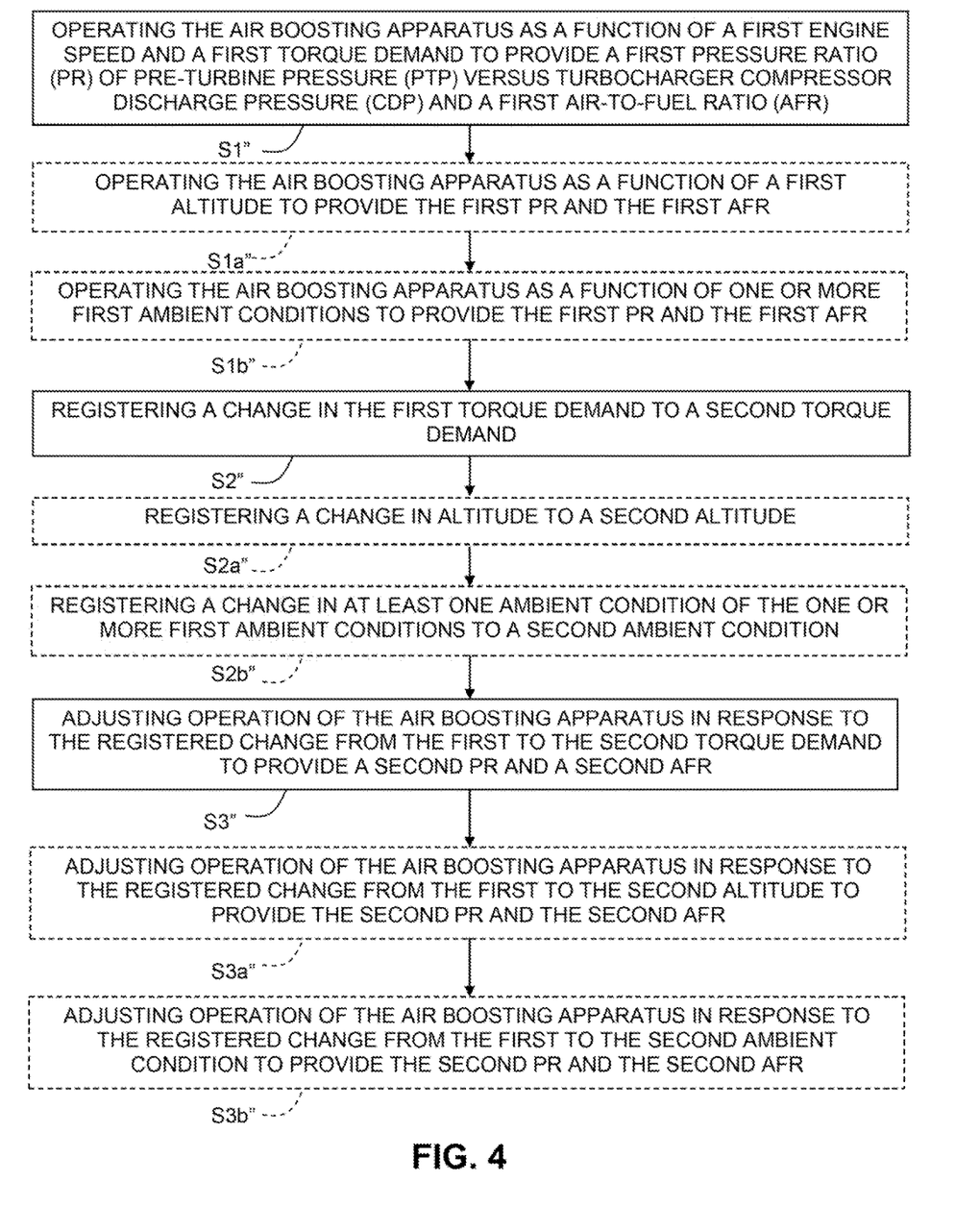
FIG. 4 is a flow diagram of a method according, to yet another aspect of the present invention.

As seen in an aspect of the method described in connection with FIG. 4, according to the method, the air boosting apparatus 25 is operated at step S1" as a function of a first engine speed and a first torque demand to provide a first pressure ratio (PR) of pre-turbine pressure (PTP) versus turbocharger compressor discharge pressure (CDP) and a first air-to-fuel ratio (AFR). At step S2, a change in the first torque demand to a second torque demand is registered. At step S3, operation of the air boosting apparatus 25 is adjusted in response to the registered change from the first to the second torque demand to provide a second PR and a second AFR.

The operation of the air boosting apparatus 25 can be adjusted in response to the registered change from the first to the second torque demand so that at least one of the second PR and the second AFR are the same as the first PR and the first AFR, or so that at least one of the second PR and the second AFR are different from the first PR and the first AFR.

The air boosting apparatus 25 can also be operated at step S1a" as a function of a first altitude to provide the first PR and the first AFR, and the method can comprise registering a change in altitude to a second altitude at step S2a", and adjusting operation of the air boosting apparatus in response to the registered change from the first to the second altitude to provide the second PR and the second AFR at step S3a". The air boosting apparatus 25 can also be operated as a function of one or more first ambient conditions to provide the first PR and the first AFR at step S1b", and the method can comprise registering a change in at least one ambient condition of the one or more first ambient conditions to a second ambient condition at step S2b", and adjusting operation of the air boosting apparatus in response to the registered change from the first to the second ambient condition to provide the second PR and, the second AFR at step S3b"

Figure 5:
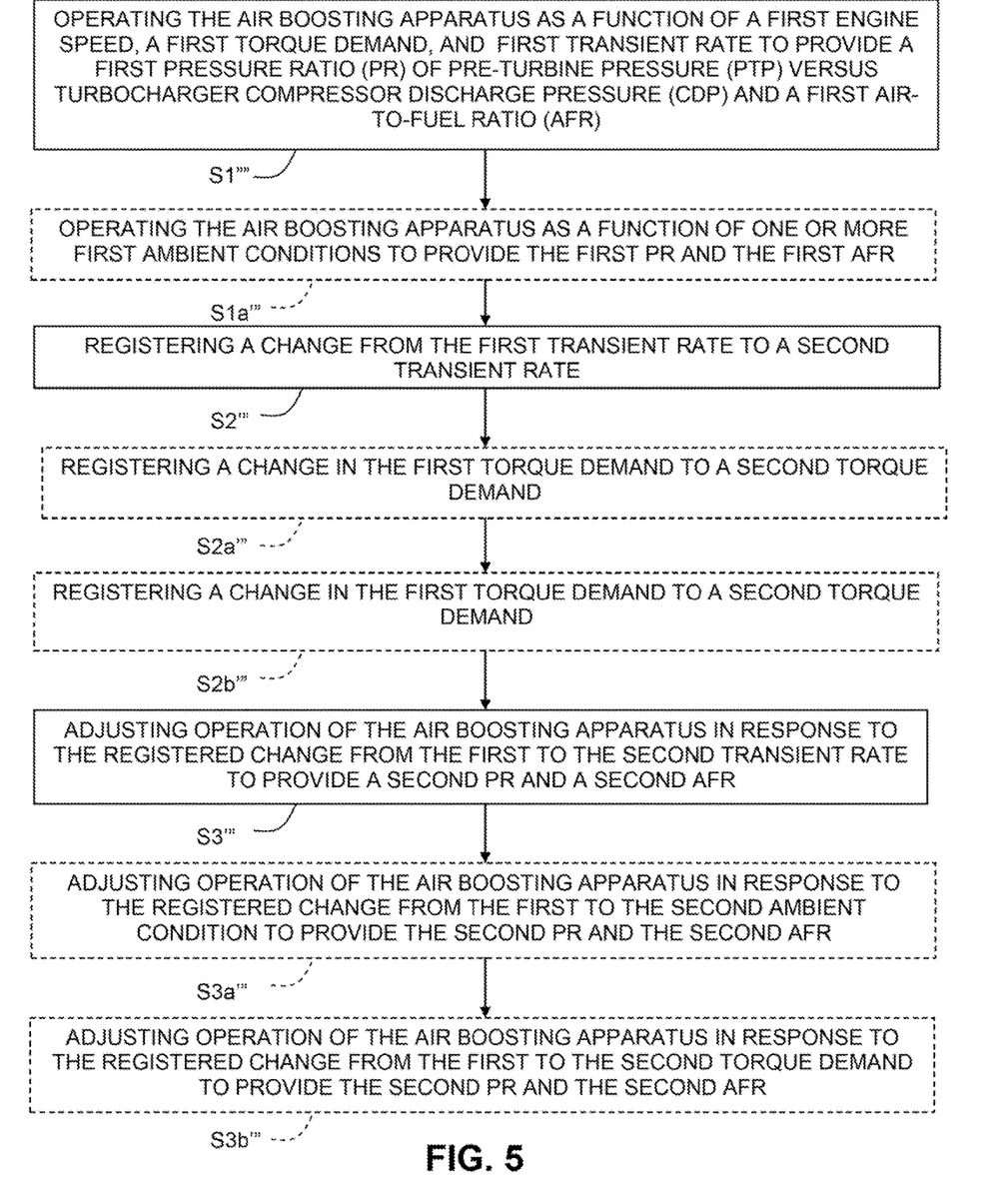
FIG. 5 is a flow diagram of a method according to still another aspect of the present invention.

As seen in an aspect of the method described in connection with FIG. 5, according to the method, at step S1''', the air boosting apparatus 25 is operated as a function of a first engine speed, a first torque demand, and a first transient rate to provide a first pressure ratio (PR) of pre-turbine pressure (PTP) versus turbocharger compressor discharge pressure (CDP) and a first air-to-fuel ratio (AFR). The transient rate is defined here as the rate of change of torque or engine speed and can be determined by, e.g., processing signals from the torque sensor 41 or the tachometer 43 in the controller 65. A change from the first transient rate to a second transient rate is registered at step S2'''. Operation of the air boosting apparatus 25 is adjusted in response to the registered change from the first to the second transient rate to provide a second PR and a second AFR at step S3'''.

Operation of the air boosting apparatus 25 can be adjusted in response to the registered change from the first to the second transient rate so that at least one of the second PR and the second AFR are the same as the first PR and the first AFR, or so that at least one of the second PR and the second AFR are different from the first PR and the first AFR.

A change in first torque demand to a second torque demand can be registered at step S2b" and operation of the air boosting apparatus 25 can be adjusted in response to the registered change from the first to the second torque demand to provide the second PR and the second AFR at step S3b'''. The air boosting apparatus 25 can also be operated as a function of one or more first ambient conditions to provide the first PR and the first AFR at step S1a", and the method can comprise registering a change in at least one ambient condition of the one or more first ambient conditions to a second ambient condition at step S2a''', and adjusting operation of the air boosting apparatus in response to the registered change from the first to the second ambient condition to provide the second PR and the second AFR at step S3a'''.

With reference to FIG. 1, the controller 65 can operate the air boosting apparatus to maintain a sufficient PR to get a desired EGR flow without having excessive pressure differentials maintain AFR, and control AFR during transient events. The controller 65 can be provided with a map layout that includes provisions for altitude and other influences on the air boosting apparatus 25 control. Multiple steady state maps can be utilized to vary the air boosting apparatus 25 speed target as a function of altitude. A target PR (pre-turbine pressure (PTP)/turbocharger compressor discharge pressure (COP)) can be a function of engine speed and load along with multiple maps for altitude. A target AFR can be a function of engine speed and load along with multiple maps for altitude. The air boosting apparatus 25 speed can reflect the maximum demanded blower speed to get EGR flow or overcome AFR deficiencies during transient operation. The controller 65 can control the air boosting apparatus 25 is to use a lowest speed possible to operate the engine in order to improve the overall fuel economy of the engine. The turbocharger should do most of the engine boosting because this uses the exhaust energy to create intake air flow and pressure. Maps can be used for various ambient temperature conditions. Further maps may be used to control other functions around the engine such as EATS system heating, DPF regenerations, and SCR regenerations. The target for any air boosting apparatus 25 control will ordinarily be to use the least amount of air boosting apparatus 25 power possible to get the best fuel economy possible in each operating mode.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling an air boosting apparatus in a two-stroke, opposed piston engine, the air boosting apparatus being arranged to boost air pressure in a charge air stream upstream of a cylinder of the engine, comprising:
   operating the air boosting apparatus as a function of a first engine speed, a first torque demand, and one or more first ambient conditions to provide a first pressure ratio (PR) of pre-turbine pressure (PTP) versus turbocharger compressor discharge pressure (CDP) and a first air-to-fuel ratio (AFR);
   registering a change, in at least one first ambient condition of the one or more first ambient conditions to a second ambient condition;
   determining a target PR and a target AFR based at least partially on the registered change; and
   after determining the target PR and the target AFR based at least partially on the registered change, adjusting operation of the air boosting apparatus to achieve the target PR and the target AFR.

2. The method as set forth in claim 1, wherein the operation of the air boosting apparatus is adjusted so that at least one of the target PR and the target AFR are the same as the first PR and the first AFR.

3. The method as set forth in claim 1, wherein the operation of the air boosting apparatus is adjusted so that at least one of the target PR and the target AFR are different from the first PR and the first AFR.

4. The method as set forth in claim 1, comprising registering a change in the first torque demand to a second torque demand, determining the target PR and the target AFR based at least partially on the registered change in torque demand, and, after determining the target PR and the target AFR based at least partially on the registered change in torque demand, adjusting operation of the air boosting apparatus to achieve the target PR and the target AFR.

5. The method as set forth in claim 1, wherein the air boosting apparatus is operated as a function of a first altitude to provide the first PR and the first AFR, the method comprising registering a change in altitude to a second altitude, determining the target PR and the target AFR based at least partially on the registered change in altitude, and, after determining the target PR and the target AFR based at least partially on the registered change in altitude, adjusting operation of the air boosting apparatus to achieve the target PR and the target AFR.

6. A method for controlling, an air boosting apparatus in a two-stroke, opposed piston engine, the air boosting apparatus being arranged to boost air pressure in a charge air stream upstream of a cylinder of the engine, comprising:
   operating the air boosting apparatus as a function of a first engine speed, a first torque demand, and a first altitude to provide a first pressure ratio (PR) of pre-turbine pressure (PTP) versus turbocharger compressor discharge pressure (CDP) and a first air-to-fuel ratio (AFR);
   registering a change in altitude to a second altitude;
   determining a target PR and a target AFR based at least partially on the registered change to altitude; and
   after determining the target PR and the target AFR based at least partially on the registered change to altitude, adjusting operation of the air boosting apparatus to achieve the target PR and the target AFR.

7. The method as set forth in claim 6, wherein the operation of the air boosting apparatus is adjusted so that at least one of the target PR and the target AFR are the same as the first PR and the first AFR.

8. The method as set forth in claim 6, wherein the operation of the air boosting apparatus is adjusted so that at least one of the target PR and the target AFR are different from the first PR and the first AFR.

9. The method as set forth in claim 6, comprising registering a change in the first torque demand to a second torque demand, determining the target PR and the target AFR based at least partially on the registered change in torque demand, and, after determining the target PR and the target AFR based at least partially on the registered change in torque demand, adjusting operation of the air boosting apparatus to provide the target PR and the target AFR.

10. The method as set forth in claim 9, wherein the air boosting apparatus is operated as a function of one or more first ambient conditions to provide the first PR and the first AFR, the method comprising registering a change in at least one ambient condition of the one or more first ambient conditions to a second ambient condition, determining the target PR and the target AFR based at least partially on the registered change to the at least e ambient condition, and, after determining the target PR and the target AFR based at least partially on the registered change to the at least one ambient condition, adjusting operation of the air boosting apparatus to achieve the target PR and the target AFR.

11. A method for controlling an air boosting apparatus in a two stroke, opposed piston engine, the air boosting apparatus being arranged to boost air pressure in a charge air stream upstream of a cylinder of the engine, comprising:
   operating the air boosting apparatus as a function of a first engine speed and a first torque demand to provide a first pressure ratio (PR) of pre-turbine pressure (PTP) versus turbocharger compressor discharge pressure (CDP) and a first air-to-fuel ratio (AFR):
   registering a change in the first torque demand to a second torque demand; and
   determining a target PR and a target AFR based at least partially on the registered change in torque demand; and
   after determining the target PR and the target AFR based at least partially on the registered change in torque demand, adjusting operation of the air boosting apparatus to achieve the target PR and the target AFR.

12. The method as set forth in claim 11, wherein the operation of the air boosting apparatus is adjusted so that at least one of the target PR and the target AFR are the same as the first PR and the first AFR.

13. The method as set forth in claim 11, wherein the operation of the air boosting apparatus is adjusted so that at least one of the target PR and the target AFR are different from the first PR and the first AFR.

14. The method as set forth in claim 11, wherein the air boosting apparatus is operated as a function of a first altitude to provide the first PR and the first AFR, the method comprising registering a change in altitude to a second altitude determining the target PR and the target AFR based at least partially on the registered change in altitude, and, after determining the target PR and the target AFR based at least partially on the registered change in altitude, adjusting operation of the air boosting apparatus in response to the registered change from the first to the second altitude to achieve the target PR and the target AFR.

15. The method as set forth in claim 14, wherein the air boosting apparatus is operated as a function of one or more first ambient conditions to provide the first PR and the first AFR, the method comprising registering a change in at least one ambient condition of the one or more first ambient conditions to a second ambient condition, determining the target PR and the target AFR based at least partially on the registered change to the at least one ambient condition, and, after determining the target PR and the target AFR based at least partially on the registered change to the at least one ambient condition, adjusting operation of the air boosting apparatus to achieve the target PR and the target AFR.

16. A method for controlling an air boosting apparatus in a two-stroke, opposed piston engine, the air boosting apparatus being arranged to boost air pressure in a charge air stream upstream of a cylinder the engine, comprising:
   operating the air boosting apparatus as a function of a first engine speed, a first torque demand, and a first transient rate to provide a first pressure ratio (PR) of pre-turbine pressure (PTP) versus turbocharger compressor discharge pressure (CDP) and a first air-to-fuel ratio (AFR);
   registering a change from the first transient rate to a second transient rate;
   determining a target PR and a target AFR based at least partially on the registered change in transient rate; and
   after determining the target PR and the target AFR based at least partially on the registered change in transient rate, adjusting operation of the air boosting apparatus to achieve the target PR and the target AFR.

17. The method as set forth in claim 16, wherein the operation of the air boosting apparatus is adjusted so that at least one of the target PR and the target AFR are the same as the first PR and the first AFR.

18. The method as set forth in claim 16, wherein the operation of the air boosting apparatus is adjusted so that at least one of the target PR and the target AFR are different from the first PR and the first AFR.

19. The method as set forth in claim 16, comprising registering a change in the first torque demand to a second torque demand, determining the target PR and the target AFR based at least partially on the registered change in torque demand, and, after determining the target PR and the target AFR based at least partially on the registered change in torque demand, adjusting operation of the air boosting apparatus to achieve the target PR and the target AFR.

20. The method as set forth in claim 19, wherein the air boosting apparatus is operated as a function of one or more first ambient conditions to provide the first PR and the first AFR, the method comprising registering a change in at least one ambient condition of the one or more first ambient conditions to a second ambient condition, determining the target PR and the target AFR based at least partially on the registered change to the at least one ambient condition, and, after determining the target PR and the target AFR based at least partially on the registered change to the at least one ambient condition, adjusting operation of the air boosting apparatus to achieve the target PR and the target AFR.

21. A method for controlling an air boosting apparatus in a two-stroke, opposed piston engine, the air boosting apparatus being arranged to boost air pressure in a charge air stream upstream of a cylinder of the engine, comprising:
   operating the air boosting apparatus as a function of at least one of
   a first engine speed,
   a first torque demand,
   a first altitude,
   a first transient rate, and
   one or more first ambient conditions
   to provide a first pressure ratio (PR) of pre-turbine pressure (PTP) versus turbocharger compressor discharge pressure (COP) and a first air-to-fuel ratio (AFR):
   registering a change in the at least one of
   the first engine speed to a second engine speed,
   the first torque demand to a second torque demand,
   the first altitude to a second altitude,
   the first transient rate to a second transient rate, and
   the one or more first ambient conditions to one or more second ambient conditions,
   determining a target PR and a target AFR based at least partially on the registered change; and
   after determining the target PR and the target AFR based at least partially on the registered change, adjusting operation of the air boosting apparatus in response to the registered change to achieve the target PR and the target AFR.

22. A two-stroke, opposed piston engine, comprising:
   an air boosting apparatus arranged to boost air pressure in a charge air stream upstream of a cylinder of the engine; and
   a controller configured to
   operate the air boosting apparatus as a function of at least one of
   at first engine speed,
   a first torque demand, a first altitude,
a first transient rate, and
one or more first ambient conditions
to provide a first pressure ratio (PR) of pre-turbine pressure (PTP) versus turbocharger compressor discharge pressure (CDP) and a first air-to-fuel ratio (AFR);
register a change in the at least one of
the first engine speed to a second engine speed,
the first torque demand to a second torque demand,
the first altitude to a second altitude,
the first transient rate to a second transient rate, and
the one or more first ambient conditions to one or more second ambient
conditions, and
determine a target PR and a target AFR based at least partially on the registered change; and
after determining the target PR and the target AFR based at least partially on the registered change, adjust operation of the air boosting apparatus in response to the registered change to achieve the target PR and the target AFR.

\* \* \* \* \*